United States Patent [19]
Freitas et al.

[11] 3,798,424
[45] Mar. 19, 1974

[54] INDUSTRIAL CONTROL SYSTEM UTILIZING HIGH SPEED DIGITAL COMPUTER

[75] Inventors: Manuel P. Freitas, South Easton; Bernard P. Laeser, Sharon, both of Mass.

[73] Assignee: The Foxboro Company, Foxboro, Mass.

[22] Filed: Aug. 20, 1971

[21] Appl. No.: 173,420

[52] U.S. Cl............ 235/150.1, 235/92 T, 340/172.5
[51] Int. Cl..................... G05b 11/30, G05b 15/02
[58] Field of Search............... 235/151.1, 151, 92 T; 340/172.5

[56] References Cited
UNITED STATES PATENTS

| | | | |
|---|---|---|---|
| 3,643,076 | 2/1972 | Bell et al.......................... | 235/151.1 |
| 3,582,621 | 6/1971 | Lawler............................. | 235/151.1 |
| 3,590,227 | 6/1971 | Porter............................. | 235/151.12 |
| 3,201,572 | 8/1965 | Yetter.............................. | 235/151 |
| 3,651,484 | 3/1972 | Smeallie.......................... | 34/172.5 |

Primary Examiner—Eugene G. Botz
Attorney, Agent, or Firm—Howard M. Bollinger

[57] ABSTRACT

An industrial process control system operated by a general purpose digital computer. A number of controlled process conditions, such as flow rate and temperature, are measured by sensors arranged to send to the computer pulse-train signals the frequencies of which are proportional to the magnitudes of respective conditions. The computer detects the incoming pulses and counts them for a fixed time period to develop corresponding digital measurement signals. These measurement signals are processed to produce corresponding digital command signals for respective process valves. The command signals are converted to respective continuous pulse-train output signals which are directed to respective process valves to control the positioning thereof.

22 Claims, 8 Drawing Figures

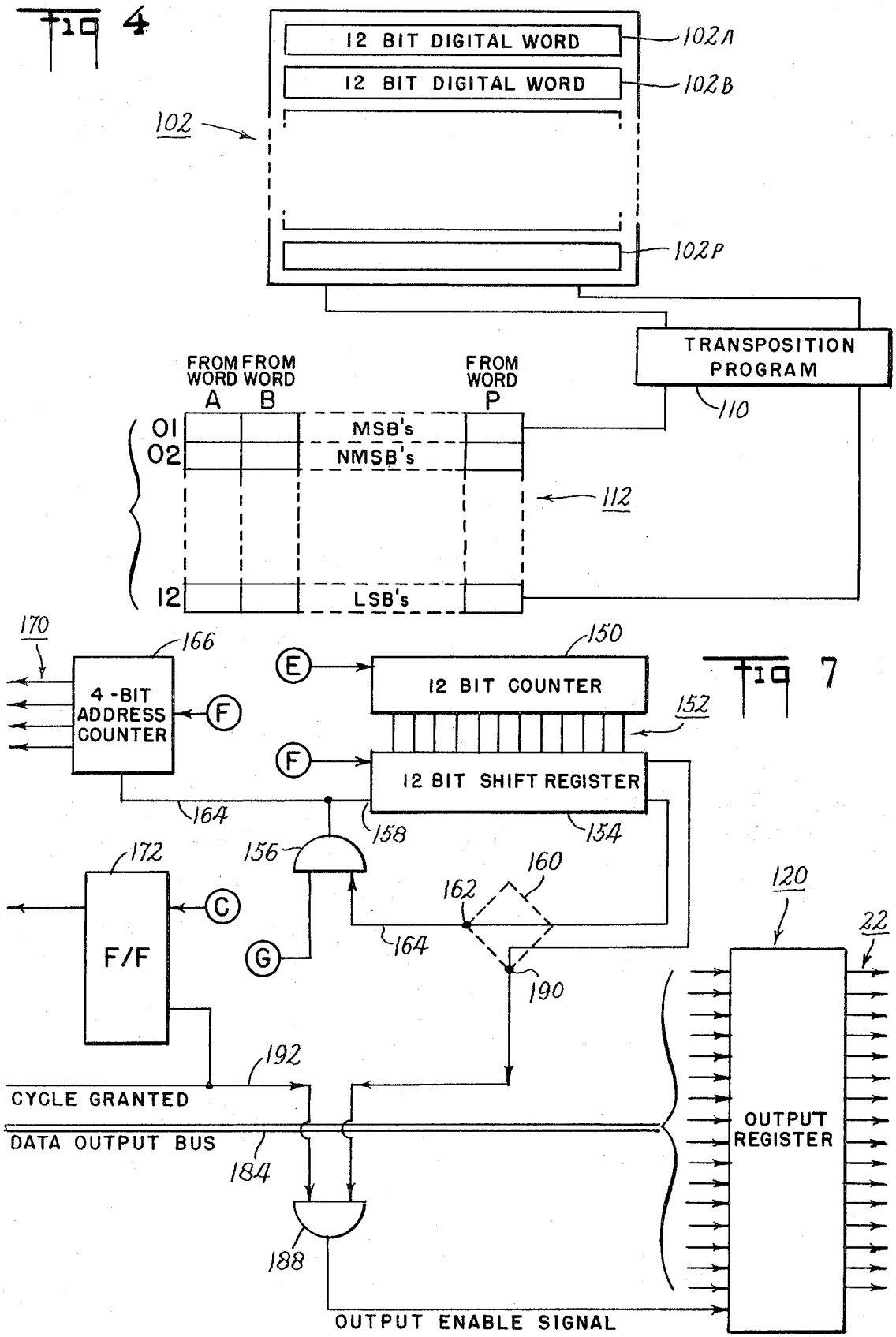

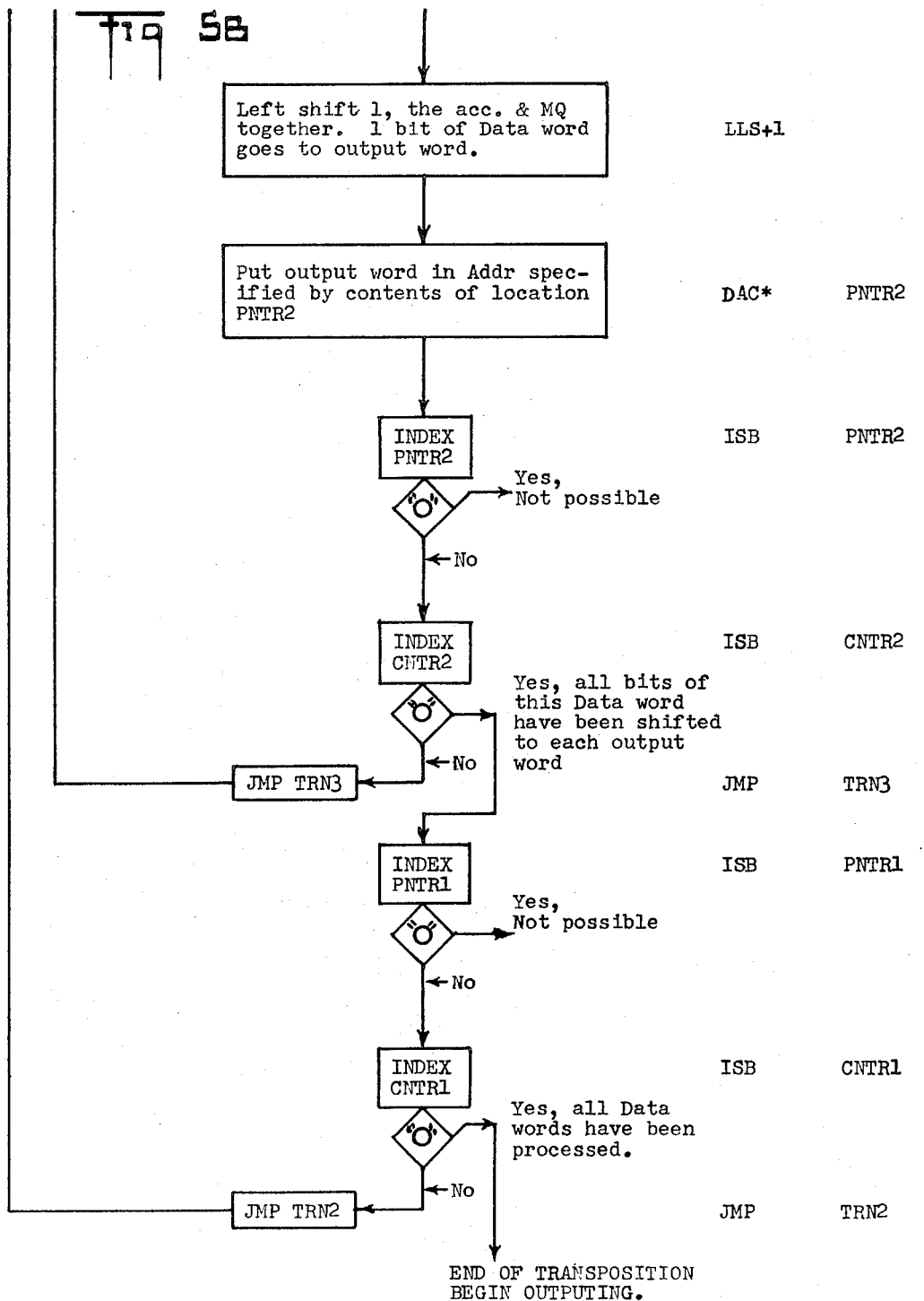

ADDR OF COMPUTED DATA WORD — NORMAL DATA STRUCTURE

```
              WORD A    xxxxxxxxxxxxxxxxxx
                  A+1   xxxxxxxxxxxxxxxxxx
                  A+2   xxxxxxxxxxxxxxxxxx
                  A+3   xxxxxxxxxxxxxxxxxx
                    :
POINTER 1 ──────► A+i   xxxxxxxxxxxxxxxxxx      CONTAINS (-)
CONTAINS                                        COUNT OF DATA
ADDR OF                   :                CNTR 1 — WORDS REMAIN-
DATA WORD         A+n   xxxxxxxxxxxxxxxxxx      ING TO BE
                                            0   TRANSPOSED
```

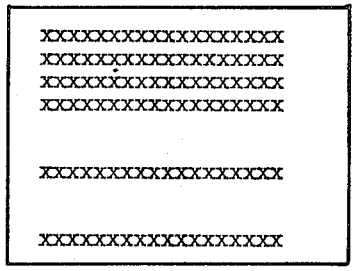

-B-

PNTR1 = WA
CNTR1 = -(n)

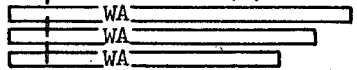
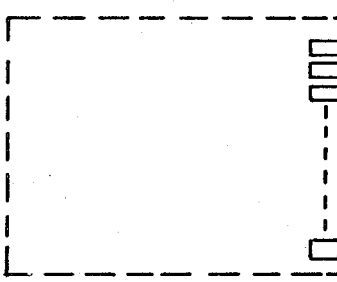

-C-

PNTR1 = WA-1
CNTR1 = -(n-1)

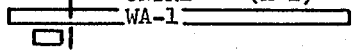
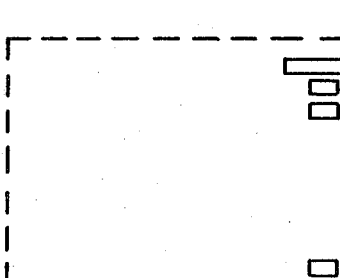

-D-

ADDR OF TRANSPOSED OUTPUT WORD — TRANSPOSED DATA STRUCTURE

```
              OUT Ø     xxxxxxALL MSB'Sxxx
                  Ø+1
                  Ø+2
                  Ø+3
                    :
POINTER 2 ──────► Ø+i   xxxxxxxxxxxxxxxxxx      CONTAINS (-)
CONTAINS                                        COUNT OF BITS
ADDR OF                   :                COUNTER 2 — PER THIS WORD
OUTPUT WORD       Ø+M   xxxxxxALL LSB'Sxxx      REMAINING TO
                                                BE TRANSPOSED
```

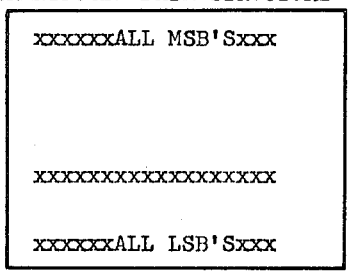

INDUSTRIAL CONTROL SYSTEM UTILIZING HIGH SPEED DIGITAL COMPUTER

BACKGROUND OF THE INVENTION

1. Field of the Invention

This invention relates to industrial control systems wherein a number of conditions are to be regulated by a time-shared digital computer. In such systems, the computer functions under program control to perform periodic calculations upon condition measurement data directed thereto, and produces output command signals respecting a plurality of operating elements such as process valves or other devices.

2. Description of the Prior Art

Time-shared digital computers have been used with industrial control systems for many years, for example, in the control and/or optimization of industrial processes. Generally speaking, for the process industries there are two types of such control systems known as (1) supervisory control and (2) direct-digital-control (DDC). In a supervisory control system, each of the process valves is continuously under the control of a respective analog controller the set point of which is adjusted at intervals by the digital computer in accordance with calculations performed on a variety of input data from the process and other sources. In a DDC system, a digital computer produces periodic valve control signals which are sent directly to the various process valves. The present invention concerns DDC systems.

The commercial application of conventional computer control systems has been limited by their relatively high cost. One of the basic cost factors in such systems is the "interface" equipment required between the computer and the process elements (including both sensors and valves). Typically, in prior art systems the process sensors produce analog signals in the form of measurement currents which are sampled periodically by input equipment (analog multiplexers, A-to-D converters, address decoders, etc.) arranged to extract the condition measurement data for the computer. Similarly, the computer output command signals are converted to analog form and distributed to the process valves or valve operators by complex output interface equipment The input and the output interface equipment must meet stringent performance specifications and has been expensive to manufacture.

SUMMARY OF THE INVENTION

In a preferred embodiment of the present invention to be described hereinbelow in detail, a computer-operated control system is provided wherein communication between the computer and the various process elements is via pulse signals. The disclosed system includes a plurality of condition sensors or transducers each arranged to produce output pulses at a rate (frequency) proportional to the magnitude of a corresponding measured process condition. These pulse-train signals are directed to a digital computer which in a simple manner periodically samples the incoming pulses and provides corresponding digital signals each representing the value of the respective measured process condition.

The computer program carries out standardized computations on these measurement signals, and produces corresponding digital command signals each identifying an instruction for a corresponding process valve. These digital command signals are converted in a simple programmatic fashion to corresponding pulse-train output signals the average frequencies of which are proportional to the digital command signals respectively. The pulse-train output signals are transmitted to corresponding process valves each arranged to be positioned in accordance with the frequency of the signal supplied thereto.

Accordingly, it is a principal object of the present invention to eliminate or substantially minimize costly conventional interface hardware heretofore required between the computer and associated peripheral elements such as sensors and process operating elements. The functions of such conventional hardware are in accordance with this invention performed either essentially under computer program control (software), or advantageously by software in conjunction with inexpensive digital logic circuitry.

A more specific object of the invention is to provide industrial process control systems which are economical to manufacture, and yet which perform reliably in the field. Other objects, aspects and advantages of the invention will in part be pointed out in, and in part apparent from, the following description considered together with the accompanying drawings in which:

FIG. 4 shows schematically how the valve command signals are transposed from standard memory format to a new memory format suited for the processor output functions;

FIGS. 5A and 5B is a flow diagram illustrating a computer program for transposing the valve command signals into the format shown in FIG. 4;

Figure 5A:
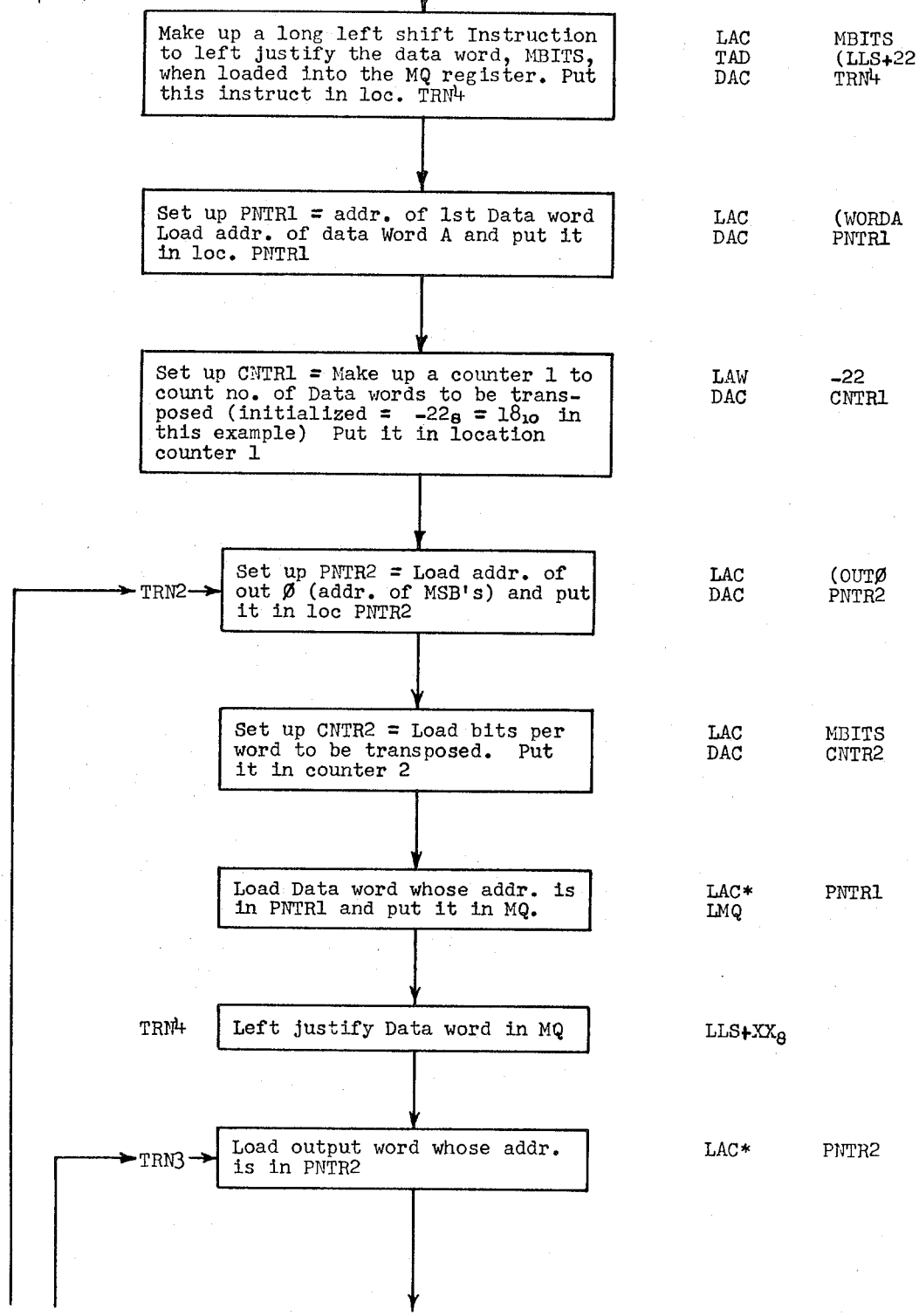

FIG. 6 (consisting of sequential FIGS. 6A through 6D) shows schematically the steps carried out by the program of FIG. 5; and FIG. 7 is a schematic diagram showing circuit details of a processor output arrangement.

Figure 1:
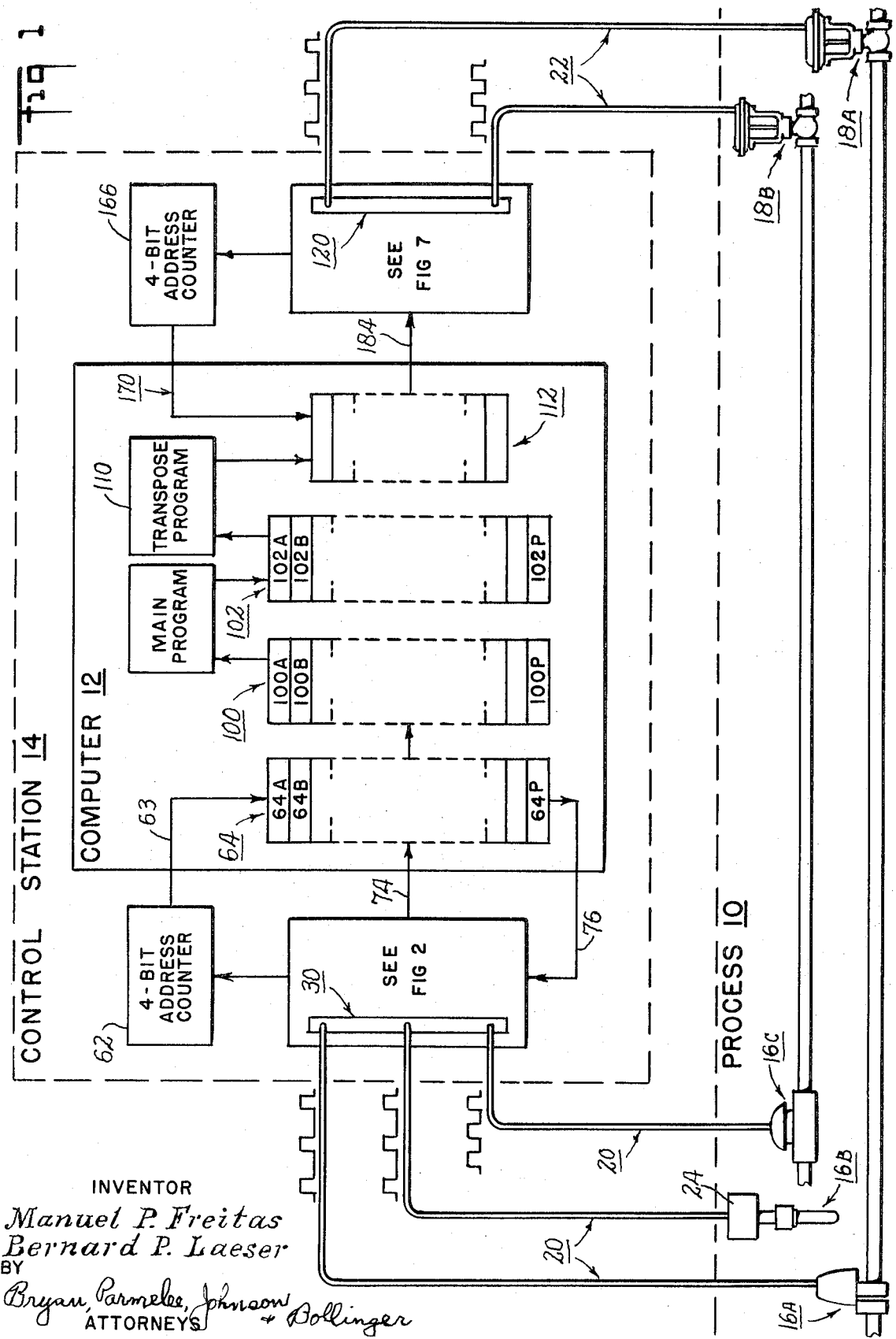
FIG. 1 is a block diagram outline of a system embodying the present invention.

FIG. 1 shows in diagrammatic form elements of an exemplary industrial process 10 to be controlled by a high-speed general-purpose stored-program digital computer 12 at a control station 14. The process may be any one of many types suited for automatic control. Alternatively, the controlled elements may comprise an individual process unit such as a reactor, a fractionator or the like, forming part of a larger overall process having a number of separate but interrelated units. In the latter event, the overall process control arrangement may include a number of separate process control systems like that shown in FIG. 1, each with its own computer 12. With such a system configuration, each computer preferably would be a so-called microcomputer, advantageously performing no function other than control of its corresponding process unit.

Associated with the process area 10 are a number of sensors or measuring instruments 16 (16A, 16B, etc.) each responsive to a corresponding process condition such as a specific flow rate, temperature, and th like. As will be described in more detail hereinbelow, these sensors produce digital measurement signals indicating the magnitudes of the respective process conditions. Also associated with the process are a number of operators 18 (18A, 18B, etc.,) typically in the form of flow control valves, or actuators, to set the valves of respective process variables which correspond to, or serve to influence, the measured process conditions.

In a system according to the present invention, communication between the process 10 and the central computer station 12 is by digital signals comprising a sequential series of pulses. Generally, the value or magnitude of the data being transmitted will be indicated by the pulse-repetition-rate, or frequency of the measurement signal, although it will be clear that pulse signals also can be used to indicate the binary state of a condition, such as whether a contact is open or closed. In FIG. 1, the sensors 16 direct pulse-train measurement signals through respective input transmission lines or channels 20 to the computer station 14, and the computer in turn directs pulse-train valve command signals through respective output transmission lines 22 to corresponding process operators 18.

There are a number of known sensors capable of producing pulse-train signals as described herein. For example, there are many different types of turbine flow meters such as illustrated at 16C. U.S. Pat. No. 3,079,800 shows a vibrating string arrangement for producing a frequency signal responsive to a pressure. For some applications, it may be preferred to employ conventional analog-output sensors in conjunction with conventional converters for producing pulse-train signals proportional to the measured condition. Such an arrangement is illustrated at 24 with the thermocouple 16B. The selection of any particular type of sensor is not a part of the present invention.

Figure 2:
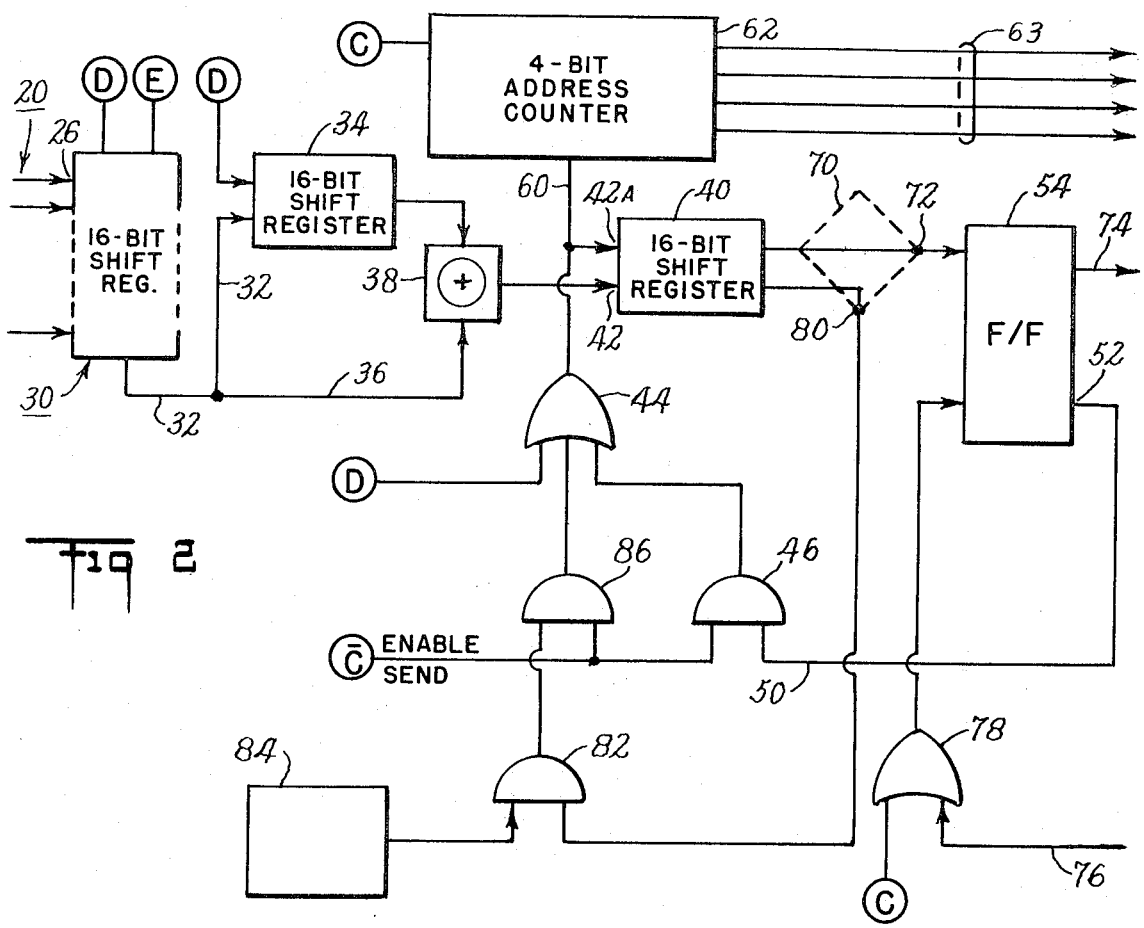
FIG. 2 is a schematic diagram showing details of the processor input arrangement.

Referring now to FIG. 2, the pulse-train measurement signals on input transmission lines 20 are directed to respective input terminals 26 leading to corresponding stages (not shown) of a shift register 30. The input lines are sampled periodically at a frequency high enough to detect every change-of-state of each line, and the sample results are inserted into the corresponding stages of the register 30 for processing to be described.

Figure 3:
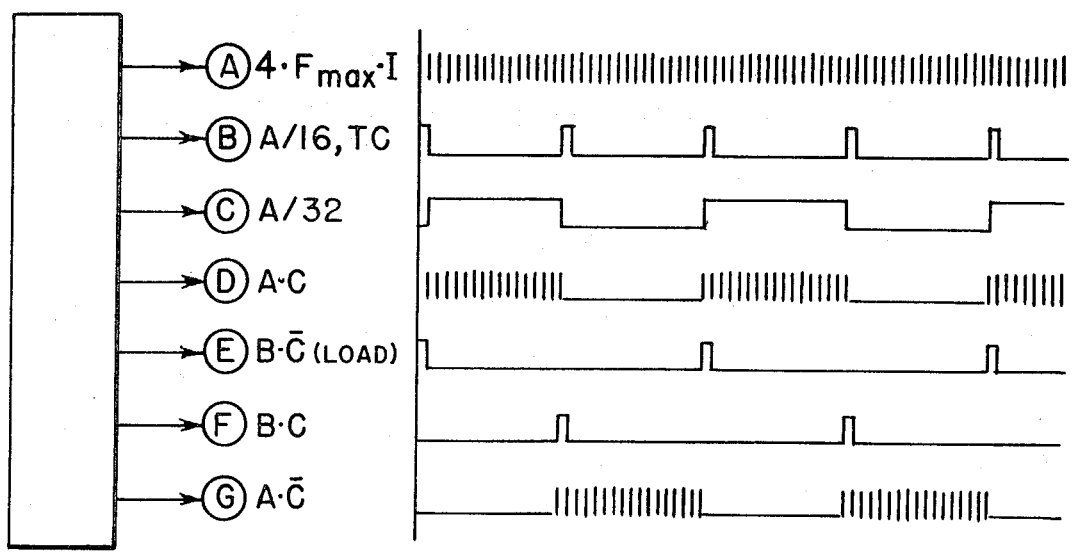
FIG. 3 is a timing diagram showing clock pulses used in controlling the processor input and output functions.

The input sampling and processing is controlled by clock pulses shown in the timing diagram of FIG. 3. These clock pulses all are derived from a crystal-controlled clock generator (not shown). The sample rate must be sufficiently high to avoid missing any of the incoming pulses. The basic clock frequency (A) thus is in part determined by the maximum pulse frequency ($F_{max}$) which the sensors 16 will produce. In the illustrated example, $F_{max}$ has for arithmetic convenience been selected to be 4,096 Hz.

In the disclosed embodiment, the computer 12 functions with a base period of one second. That is, the computer readjusts the frequencies of the output pulse-train signals for the process operators 18 once every second. During each one-second base period, there are $2 \cdot F_{max}$ (i.e., 2 × 4,096) so-called operating cycles, with each operating cycle divided into two sequential phases of equal duration. The first phase provides for sampling and storing fresh input data, and the second phase provides for transferring the data to the computer 12. Because of this two-phase operation, the minimum clock frequency A will be: $4 \cdot F_{max} \cdot I$ (where $I$ is the number of input lines).

With 16 input lines, as illustrated, the clock frequency A is 262,144 Hz. The number of actual input lines will of course depend upon the particular system design. The sampling of the input lines 20 occurs at the start of each operating cycle, under control of clock E (FIG. 3). At this instant, each of the input lines is in effect connected to a corresponding stage of register 30, so that the stages will be loaded with binary bits (ones and zeros) indicating the states of respective input lines at the time of sampling. It may be noted that the sequential position of each bit in the register effectively identifies the corresponding input line.

Immediately after sampling of the input lines 20, the contents of shift register 30 (16 sample bits) are shifted out serially through a lead 32 connected to the input of a second shift register 34. Lead 32 also is connected, through another lead 36, to one input of an "Exclusive-or" gate 38. The other input to this gate receives the serial output of the contents of register 34, i.e., the 16 data bits which were stored in register 34 during the preceding operating cycle. These data bits in both registers 30 and 34 are shifted out by strobe clock D during the first phase of the operating cycle.

Exclusive-or gate 38 effectively compares each bit of the new sample (from register 30) with the corresponding bit of the preceding sample (from register 34), and produces at the gate output a set of sequential binary signals indicating whether there was, between the tow samples, a change-of-state of voltage on any of the input lines 20. The output of gate 38 will be a binary one for any bit position (input line) where the bit stored in register 34 during the preceding cycle differs from the corresponding bit stored in register 30 at the start of the current cycle. That is, the output of gate 38 provides what might be termed "reversal" bits each indicating whether there has been a change-of-state (from one to zero, or vice versa) on any input line. The sequential position in the gate output of such reversal bit will identify the input line.

These reversal bits developed by gate 38 are loaded into a third 16-bit register 40 under control of clock pulses D applied to the register shift terminal 42 through an Or gate 44. This register 40 provides temporary storage of the reversal bits pending transfer of the sample data to the main digital memory of the digital computer 12.

Transfer of the sample data to the computer takes place during the second half of the operating cycle. This transfer phase is initiated by clock C which applies a high signal to an "Enable Send" lead connected to an And gate 46 driving the shift terminal Or gate 44. The other input to And gate 46 is high at the start of the second half of the operating cycle. This other input to And gate 46 is controlled by a lead 50 connected to the reset terminal 52 of a flip-flop 54 which controls the incrementing of portions of the main computer memory as will be described. At the start of the transfer phase, this flip-flop is in its normal reset state, so lead 50 is high, and a high shift signal therefore is applied from And gate 46 through Or gate 44 to the shift terminal 42A of register 40.

The shift signal also is connected through a lead 60 to the input terminal of a four-bit address counter 62 to advance that counter to its first position. Counter 62 provides on its output leads 63 an address signal for the main computer memory. This address signal identifies in a 16-word memory section 64 (FIG. 1) a specific storage location 64A, etc. corresponding to the bit position of the reversal bit to be examined. As explained previously, this bit position in turn corresponds to a particular input line 20. Thus, each of the storage locations 64A, etc., corresponds to a particular input line and its associated condition sensor 16.

(Note: Although many different types of computers can be used for the functions described herein, the illustrative embodiment will be described hereinbelow with reference to a specific computer identified as Model PDP-15, manufactured by the Digital Equipment Corporation (DEC), located in Maynard, Massachusetts.)

When clock $\overline{C}$ goes high at the start of the transfer phase of the operating cycle, the right-hand end bit in register 40 is shifted out to a so-called "decision circuit" illustrated by the diamond-shaped block 70. In the particular arrangement described herein, this decision circuit consists simply of (1) a direct connection between the set output terminal of register 40 and the set input terminal of flip-flop 54, and (2) a direct connection from the reset output terminal of register 40 to a circuit (to be described) which controls the shift input signal to register 40.

This decision circuit 70 in effect analyzes each reversal bit developed at the output of the register 40 to determine if it is a one or a zero. If it is a one, the primary output 72 of the decision circuit goes high to set the increment-control flip-flop 54. This flip-flop will thereupon send a high signal through Increment Memory lead 74 (a conventional interface arrangement in the DEC PDP-15 computer) to the storage location of memory 64 identified by the particular binary signal on output leads 63 of address counter 62. The high signal on lead 74 serves to increment by one the memory location so identified. That is, the binary number stored in the addressed memory location will be increased by one. Consequently, it will be evident that the numbers stored in memory locations 64A, etc., will at any given time represent the number of pulses received from the corresponding sensor 16 since the start of the 1 second computer base period.

After the memory location has thus been incremented, the computer 12 sends back the usual "received" signal on a line 76 to indicate that the operation has been completed. Line 76 connects through an Or gate 78 to the reset input of flip-flop 54, and thus returns that flip-flop to its normal reset condition. This causes leed 50 to go high, thus again placing a shift signal at the shift terminal 42 of register 40, and simultaneously advancing the address counter 62 to its next count condition to indicate the storage location corresponding to the next bit shifted out of register 40.

If the reversal bit shifted out of register 40 to gate 70 is a zero (indicating that the corresponding input transmission line 20 did not have a change-of-state between the two preceding sample times), the secondary output 80 of decision circuit 70 goes high. The primary gate output 72 will remain low, so that flip-flop 54 will remain in its reset state, and thus no new data will be loaded into the memory 64.

The high signal on secondary output 80 however opens an And gate 82 to direct a high-frequency (10MHz) signal from a multi-vibrator 84 to another And gate 86 (now open, due to the Enable Send signal on its other input). This produces almost immediately a high signal through Or gate 44 to the shift terminal 42A, thereby initiating another shift cycle for register 40 and address counter 62. Consequently the next bit is shifted out from register 40 to be checked by decision circuit 70 as described above. If this bit is a one, line 80 will go low to close And gate 32 and turn off the shift signal pending transfer of the bit then being examined.

To summarize: During the first phase of each operating cycle, all of the incoming lines 20 are sampled, and the resultant binary sample signals are analyzed by logic circuitry to determine whether any incoming line has experienced a change-of-state since the preceding operating cycle. The result of this analysis appears as a sequential set of "reversal" bits which are fed into register 40. Each change-of-state is indicated by a binary one which is located in a sequential bit position corresponding to the input line on which the change was detected. During the second phase of the operating cycle, all of the reversal bits stored in register 40 are examined in sequence and, if any is found to be a "one," a corresponding storage location 64A, etc., in memory section 64 is incremented by one.

Such operating cycles continue repetitively for a predetermined time period, for example, 1 second. At the end of that period, each of the various separate storage locations in memory section 64 will contain a digital number indicating the total number of reversals experienced on the corresponding input line during the preceding complete base period. This number reflects the actual number of pulses transmitted by a corresponding sensor 16 during the selected time period, and thus indicates the magnitude of the process condition being measured.

At the end of each such counting period, for example once a second, the computer operates under program control to transfer the stored data from the separate locations 64A, etc., in memory 64 to corresponding locations 100A, etc., in a working store 100. At the same time, memory 64 is cleared (reset to zero) for its next operating period of accumulating reversal counts as described. The computer then carries out the usual programmed computations sequentially on each set of data in working store locations 100A, etc., to produce corresponding digital answer signals in the form of separate words each representing a command or instruction for a respective process operator 18. Each of these commands is placed in the usual fashion in a corresponding location 102A. etc. in an output store 102.

As soon as these command instructions have been developed by the computer 12 (which occurs extremely rapidly), the system begins to send corresponding output control signals to the process operators 18. In the preferred embodiment of this invention, each of the digital words in store 102 is converted to a corresponding pulse-train signal having an average pusle-repetition-rate (frequency) determined by the digital number representing the command. Specifically, in th preferred embodiment, the average output pulse rate is directly proportional to the stored number.

To carry out such a conversion from the standard parallel-digital format to pulse-train format in a simple and economical manner presents a problem with subtle but serious difficulties. One part of the problem stems from the fact that, in the usual memory arrangement employed in general purpose computers wherein the separate command words are stored in respective addressable locations, the words can only be accessed individually, i.e., one at a time. Thus the digital numbers of all of the command instructions are not available continuously to develop continuous pulse-train signals.

This problem has been solved, in accordance with one aspect of the present invention, by a procedure which includes as one step (actually a series of programmed steps) the transposition of the stored instruction words from conventional format into a uniquely different format especially suited for controlling the development of continuous pulse-train signals each having a corresponding average pulse-rate. More specifically, and referring now to FIG. 4, it will be seen that each command instruction signal is stored in memory section 102 as a digital number having (for example) a total of 12 bits, from the most-significant-bit (MSB) to the least-significant-bit (LSB). These instruction words are placed in corresponding memory locations identified as 102A through 102P. Each location is individually addressable to access the corresponding 12-bit word. (In a DEC PDP-15 computer, each word contains 16 bits, but in the present example only 12 bits are used because that provides adequate resolution for exemplary purposes.)

The data stored in memory section 102 is transposed by a computer program (identified in FIGS. 1 and 4 with the functional block 110) and is re-stored in a new format in another memory section 112 containing, for the illustrated example, 12 word locations identified as 01 through 12. This transposition will be described below in detail, but briefly, the program operates in effect to invert rows and columns of the original command instruction data to present the data in the new format. In this format, all of the MSB's of the command words are placed in one location 01, all of the next-most-significant-bits (NMSB's) are placed in the next location 02, and so on, with all of the LSB's in the last location 12.

Fig. 5 shows a flow diagram setting forth the details of an exemplary computer program for carrying out this format transposition, with the data being transferred from memory section 102 to memory section 112. The illustrated program has been specifically arranged for the DEC PDP-15 computer. The instructions identified as Lac, Tad, etc., are assembly language statements taken from the PDP-15 instruction list published by the manufacturer. FIGS. 6A through 6D illustrate diagrammatically the basic steps performed in taking the 12-bit data words one after another from their original storage locations and distributing the individual bits of each data word in respective storage locations in the new set of locations.

In this transposed configuration, it becomes possible by relatively simple means to carry out an outputting program or procedure whereby the individual bits of the command instructions can be used to develop continuous and simultaneous pulse-train signals for all of the process operators 18. Various procedures can be utilized to carry out this concept, and one specific procedure will be described hereinbelow in detail. In this procedure, the storage locations 01 through 12 are accessed in a special sequence and the individual bits of each word are used to control (with a one or zero) corresponding stages of an output register 120. This sequential accessing and outputting program operates continuously to produce the pulse-train signals of proper repetition rate as determined by the respective command signal.

Each of the pulse-train output signals could be produced by logic circuitry functionally equivalent to a "binary rate multiplier." Such devices are available commercially, and operate to convert a parallel binary number to a corresponding continuous frequency signal. In such devices, a counter is operated by a clock signal to produce a series of binarily-weighted constant-frequency signals (F/2, F/4, F/8, etc.). These signals are coupled to gates controlled by the individual bits of the parallel signal, with the MSB controlling the highest frequency signal, the NMSB controlling the next highest frequency signal, etc. The outputs of the gates are combined, with anti-coincidence circuits being used to prevent pulse overlap. The result is a frequency signal the average pulse rate of which is proportional to the parallel digital signal.

In the procedure of the present embodiment, the MSB's of all of the command words (which after transposition are stored as a new data word, or set of bits, in storage location 01) are used simultaneously and periodically to produce output pulses corresponding to the output frequency $F/2$. That is, for each command word the MSB of which is one, a corresponding output line 22 will receive a series of pulses at the highest frequency F/2. The NMSB's of the command words are used during selected intervals between the maximum frequency "F/2" pulses as additional output pulses of frequency F/4. Thus, for each NMSB which is a one, a corresponding output line 22 will receive a set of pulses at a frequency of F/4, at selected times between pulses of the highest frequency F/2.

This procedure is used with all of the new data words 01 through 12, to insert progressively lower-frequency pulse-trains in hte output lines 22 for each lower order bit which is a binary one. Thus for each LSB which is a binary one, a corresponding output line will receive a series of pulses at the lowest binarily-weighted frequency corresponding to the 12th bit of the command word. The outputting of bits in this manner continues during the entire base period which as mentioned previously typically may be one second.

The selection of the various data words 01, 02,... (containing the MSB's, etc.) for outputting is controlled by a special arrangement which assures that each data word is selected for the proper number of times during the output time period. The approach used is to increment a 12-bit master counter by a clock signal at the maximum operating frequency (e.g., 8192 Hz). For each count position, a data word (01, etc.) is selected to be outputted. The selected word corresponds to the number of binary zeros following the last (least significant) binary one in the output of the counter. It can be demonstrated that this procedure will select each data word for the exact number of times required to provide the output pulse-train signals with an average pulse rate corresponding to the binary number of the respective command word.

In more detail, and referring now to FIG. 7, the outputting arrangement includes a 12-bit counter 150 driven by clock pulses E (8,192 Hz) (see FIG. 3) which occur at the start of each operating cycle. The 12 output lines 152 of the counter are connected to corresponding stages of a 12-bit shift register 154 through gates controlled by loading clock pulses F which occur half-way through each operating cycle. Thus, at each load clock pulse F, the shift register 154 receives a digital number representing the current count of the counter 150. Immediately after each load clock pulse F, shift clock pulses G are applied through an And gate 156 to the shift terminal 158 and the register contents begin shifting out to a decision circuit represented by the block 160 which determines whether each bit is a one or a zero.

This decision circuit 160 produces a high (logical one) signal on its primary output 162 when the output from register 154 is low (logical zero). This primary output is connected by lead 164 to And gate 156 to hold this gate open to transmit shift clock pulses G to the register 154 as long as zeros are emerging from the register. These shift pulses from And gate 156 also are directed through a lead 164 to a four-bit address counter 166 which is set at zero count when the contents of register 154 begin to be shifted out to the decision circuit 160.

When the decision circuit 160 receives the first binary one from register 154, its primary output 162 goes low to close the And gate 156 and shut off the shift pulses G. Thus, the address counter 166 remains at the count position it had reached immediately preceding the emergence of the first binary one. This count position indicates the number of zeros which emerged from the register before a one was detected. The four output lines 170 of the counter are directed to the computer memory selector circuitry to identify the address in memory section 112 of a data word (01, 02, etc.) corresponding to the counter output number.

At the end of the operating cycle, i.e., at the start of the next cycle, clock pulse C sets a flip-flop 172 to produce a "cycle-request" signal for the computer. (Such a cycle-request signal is conventional in the DEC PDP-15 computer referred to above). In response to that request signal, the computer accesses the data word memory location (01, etc.) identified by address counter 166, and places the data bits from that address on respective lines of the 16-line Data Output Bus 184. These lines are coupled through respective Enable gates (not shown) to corresponding flip-flop stages of the output register 120. These output stages are coupled respectively to the output lines 22 leading to the process valves 18.

This data word selection procedure continues at the operating cycle frequency, and thus periodically presents to the output register 120 a fresh set of data bits. The output of address counter 166 determines which set is presented and the series of output addresses produced by this counter follow a predetermined sequence throughout the entire base period (one second) of the computer control system.

To illustrate this predetermined sequence, Appendix A has been included to present in tabular form exemplary data showing the operation of the address generator equipment of FIG. 7 over a full base period. In the left-hand column of Appendix A is shown the progressively increasing binary numbers developed by the counter 150 and loaded into shift register 154. The middle column lists the number of shifts in that register required to produce a "one" at its output. That is, the middle column lists the number of zeros following the last binary one in the counter number. The right-hand column shows the number produced by address counter 166 in response to output pulses equal to the number in the middle column.

When no count pulses are sent to the address counter 166 (because the last bit in the left-hand column is a one), the counter will produce a zero address (all four lines 170 zero) identifying the data word containing all of the MSB's. This occurs every other cycle, so that the MSB's are outputted at the maximum pulse frequency F/2. The NMSB's are addressed half as often as the MSB's, so that for every NMSB which is a "one", the corresponding output line 22 will receive a high signal at half the maximum pulse frequency rate, or F/4. The higher the number in the middle column, the less frequently will the corresponding address be selected. Thus the data word containing the LSB's will be addressed the least frequently of the entire set of data words. This occurs when the master counter 150 reaches 100000000000, with eleven zeros following the binary one, and a memory address of 1011 will be developed by address counter 166 corresponding to the LSB storage location.

The output register Enable gates are controlled by an Enable signal from an And gate 188. One input to this And gate is derived from the secondary output 190 of the decision circuit 160; this output goes high when the first binary one is detected in the output of the shift register 154. The other And gate input is derived from the "cycle granted" line 192 of the computer (conventional in a PDP-15 computer) which goes high when the computer has placed the selected output data on the Data Output Bus 184. When the And gate 188 is turned on at that time, the 16 bits of data from the selected word location (comprising a complete data word, such as all of the MSB's, or all of the NMSB's, etc.) are loaded into the output register 120 to set the corresponding flip-flops of that register.

The cycle-granted line 192 also is connected to the reset terminal of cycle-request flip-flop 172, so that while the data is loaded into output register 120, flip-flop 172 is reset to indicate to the computer that the operation has been completed. Thus, the cycle-granted line 192 goes low immediately after loading of the data, and the computer returns to its other activities such as described hereinabove. In one outputting arrangement, the individual stages of the output register can remain at the set or reset level (in accordance with the bits loaded into those stages) for the remainder of the operating cycle. In a modified form of outputting apparatus having certain advantages, the individual stages are arranged to remain set only for a predetermined time period, e.g., for one-half of an operating cycle, and then are reset. Thus, all of the output stages will be reset for the second half of the operating cycle.

With either outputting arrangement described herein, the pulse-repetition rate typically will not be uniform throughout the one-second base period. Instead, the output will be what might be termed a "lumpy" frequency signal wherein output pulses often appear bunched together consecutively, in what might seem to be somewhat random fashion. However, the average output pulse-rate for any output line 22 over the base period will be directly proportional to the command instruction number for the process valve to which that output line is connected.

Appendix B has been included to illustrate one format of output signals developed by the programmed procedure described above, using an outputting arrangement where each stage of the output register 120 remains set (or reset) for the entire operating cycle. Section B-1 of this appendix sets forth 16 12-bit command words, labelled WA through WP, each intended as a control instruction for a respective process valve. To simplify the presentation, the first six bits of each word are zeros, i.e. the instruction data is contained solely in the last six bits, and thus only these bits are required for the transposition program previously described.

Section B-2 of Appendix B shows the instruction data in its transposed format. It will be noted that these are only six words of data, due to the fact that only six data bits were used in the original command words. Each transposed word contains 16 bits, corresponding to the original 16 command words. All of the most significant bits (MSB's) are in one word row labelled Bit 01, the MNSM's are in the next row labelled Bit 02, etc. The column heading (WA, WB, etc.) indicates the original command word source of the data bits in each column.

Section B-3 of Appendix B is, in effect, a timing diagram which should be read downwards, that is, the progression downwards indicates equal intervals of time labelled 001, 002, etc. The binary numbers (ones and zeros) in the sixteen data columns (labelled A, B, etc.) represent the output signals sent to 16 corresponding process valves in response to the respective command words WA, WB, etc. Each binary "one" indicates a positive (or high) pulse out of the output register 120, and each binary "zero" represents a zero (or low) pulse output from the register. In this example, the total time period for developing the pulse train output signals is one second. With the simplified example of only six bits of data per command word, the clock frequency for outputting the data can be fixed at 64 Hz. Thus, only 64 time intervals have been shown for the 1 second base period.

In several places on section B-3, the digits have been outlined with pulse-shaped lines to illustrate how the pulse-train output would appear diagrammatically. It may be noted in this regard that the pulse-train column labelled "G" consists of a continuous set of consecutive pulses, i.e., an essentially continuous high signal. This reflects the fact that the corresponding six bits of command instruction are all "ones", as will be seen from inspection of section B-1. The other signals are illustrative of more typical conditions, where the average output pulse-rate (frequency) is something more nearly intermediate between 100 percent (64 pps) and zero percent (0 pps).

The pulse-train signals carried by output lines 22 are directed to respective process operators or valves 18. These operators include means responsive to such pulse-train signals for setting each valve at a position corresponding to the average pulse rate during the base period. The valves do not shift significantly when the pulses are bunched together as sometimes occurs during portions of the base period. Each valve (or other operator) is slow-acting, relative to the system base period, and will shift position only at moderate speed.

The process valves preferably include as an integral part thereof appropriate circuit means responsive to the electrical pulse-train signals, because such an integrated arrangement would ordinarily be the most economical configuration. However, in some cases it may be desirable to incorporate with each valve, or immediately adjacent thereto in the field, conventional frequency-to-analog devices, e.g., devices which convert the pulse-train output signals to corresponding analog current or voltage signals. Such analog signals might, for example, be used to control the valves directly, or might be directed to corresponding conventional current-to-air converters at each process valve arranged to develop corresponding pneumatic signals (e.g., between 3 and 15 psi) for actuating standard diaphragm-type pneumatic valves. It will be apparent that the choice of any particular type of process operator 18 forms no part of the present invention.

Although a specific preferred embodiment of the present invention has been described hereinabove in detail, it is desired to emphasize that this is for the purpose of illustrating the invention, and should not be construed as necessarily limiting the scope of the invention except as required by the prior art. Numerous modifications within the scope of the invention will be apparent to those skilled in the art, in accordance with the individual requirements of specific applications.

APPENDIX A
Output address generator state table

| Master counter 150 states | Number of right shifts reqd. to get a "1" in LSB of shift register 154 | Address counter 166 states (=address to I/O bus) |
|---|---|---|
| 000000000000 | -- | ---- |
| 001 | 0 | 0000 |
| 010 | 1 | 0001 |
| 011 | 0 | 0000 |
| 100 | 2 | 0010 |
| 101 | 0 | 0000 |
| 110 | 1 | 0001 |
| 111 | 0 | 0000 |
| 000000001000 | 3 | 0011 |
| 1001 | 0 | 0000 |
| . | . | . |
| . | . | . |
| . | . | . |
| 001010000000 | 7 | 0111 |
| . | . | . |
| . | . | . |
| . | . | . |
| 001010000100 | 2 | 0010 |
| . | . | . |
| . | . | . |
| . | . | . |
| 100000000000 | 11 | 1011 |
| . | . | . |
| . | . | . |
| . | . | . |
| 111110011110 | 1 | 0001 |
| 111110011111 | 0 | 0000 |
| 111110100000 | 5 | 0101 |

APPENDIX B

Binary value of data words        MSB's
       LSB's

```
WA  0000000000001
WB  0000000000010
WC  0000000000100
WD  0000000001000
WE  0000000010000
WF  0000000100000
WG  0000000111111
WH  0000000011111  } Normal data structure
WI  0000000001111       (16 words)
WJ  0000000000111
WK  0000000000011
WL  0000000011000
WM  0000000011000
WN  0000000011100
WO  0000000011110
WP  0000000010101
```

Binary value of transposed data

```
        WWWWWWWWWWWWWWWW
        ABCDEFGH IJKLMNOP
Bit 00  0000011000010000  ←——————————— MSB's
Bit 01  0000101100011111  ←——————————— NMSB's
Bit 02  0001001110011110
Bit 03  0010001111000111
Bit 04  0100001111100010
Bit 05  1000001111100001  ←——————————— LSB's
```

Pulse outputs

```
Time    PPPPPPPPPPPPPPPP
Intvl   ABCDEFGH IJKLMNOP
001     0000011000010000
002     0000101100011111
003     0000011000010000
004     0001001110011110
005     0000011000010000
006     0000101100011111
007     0000011000010000
```

APPENDIX B

Binary value of data words

```
008    001000111100011 1
009    000001100001000 0
010    000010110001111 1
011    000001100001000 0
012    000100111001111 0
013    000001100001000 0
014    000010110001111 1
015    000001100001000 0
016    010000111110001 0
017    000001100001000 0
018    000010110001111 1
019    000001100001000 0
020    000100111001111 0
021    000001100001000 0
022    000010110001111 1
023    000001100001000 0
024    001000111100011 1
025    000001100001000 0
026    000010110001111 1
027    000001100001000 0
028    000100111001111 0
029    000001100001000 0
030    000010110001111 1
031    000001100001000 0
032    100000111110000 1
033    000001100001000 0
034    000010110001111 1
035    000001100001000 0
036    000100111001111 0
037    000001100001000 0
038    000010110001111 1
039    000001100001000 0
040    001000111100011 1
041    000001100001000 0
042    000010110001111 1
043    000001100001000 0
044    000100111001111 0
045    000001100001000 0
046    000010110001111 1
047    000001100001000 0
048    010000111110001 0
049    000001100001000 0
050    000010110001111 1
051    000001100001000 0
052    000100111001111 0
053    000001100001000 0
054    000010110001111 1
055    000001100001000 0
056    001000111100011 1
057    000001100001000 0
058    000010110001111 1
059    000001100001000 0
060    000100111001111 0
061    000001100001000 0
062    000010110001111 1
063    000001100001000 0
```

1 sec

We claim:

1. A computer-operated industrial process control system comprising:

a plurality of sensors each responsive to a condition of the process such as temperature or flow rate and arranged to produce pulse signals containing information indicating the respective condition;

first transmission circuit means having a plurality of channels coupling the pulse signals from said sensors to a control station;

a high-speed digital computer at said control station;

memory means associated with said computer;

means at said control station responsive to the incoming pulse signals from said sensors and operable to store in corresponding memory locations digital measurement signals reflecting the status of the process condition represented by the received pulse signals;

a plurality of process operators for setting the values of selected process variables which influence at least certain of said measured process conditions;

said computer including means arranged to operate on said stored measurement signals to produce corresponding command signals, each representing an instruction for a corresponding process operator, and to store such command signals in corresponding memory locations;

output means at said control station to produce a set of output pulse-train signals each having an average frequency determined by a corresponding command signal; and second transmission circuit means coupling said output signals to respective process operators;

said process operators being responsive to said pulse-train output signals for setting said variables in accordance with the corresponding signal frequency.

2. A system as claimed in claim 1, wherein at least a portion of said sensors include means to produce pulse-train signals having a frequency responsive to the measured process condition.

3. A system as claimed in claim 2, wherein said processor includes input logic circuitry operating under program control and serving to produce measurement signals representing the number of incoming pulses received during predetermined time intervals.

4. A computer-operated industrial process control system comprising:

a plurality of sensors each responsive to a condition of the process such as temperature or flow rate and arranged to produce pulse signals containing information indicating the respective condition;

first transmission circuit means having a plurality of channels coupling the pulse signals from said sensors to a control station;

a high-speed digital computer at said control station;

memory means associated with said computer;

means at said control station responsive to the incoming pulse signals from said sensors and operable to store in corresponding memory locations digital measurement signals reflecting the status of the process condition represented by the received pulse signals;

a plurality of process operators for setting the values of selected process variables which influence at least certain of said measured process conditions;

said computer including means arranged to operate on said stored measurement signals to produce corresponding command signals, each representing an instruction for a corresponding process operator, and to store such command signals in corresponding memory locations, said command signals comprising a series of command words the bits of which are stored in said memory means with all of the data bits of common binary weight being accessable as individual and separately addressable sets of data bits;

output means at said control station to produce a set of output pulse-train signals each having an average frequency determined by a corresponding command signal, said output means including means operable with said individual sets of data bits in a predetermined sequence to develop said pulse-train output signals; and second transmission circuit means coupling said output signals to respective process operators;

said process operators being responsive to said pulse-train output signals for setting said variables in accordance with the corresponding signal frequency.

5. A computer-operated industrial process control system comprising:

a plurality of sensors each responsive to a condition of the process such as temperature or flow rate and arranged to produce pulse signals containing information indicating the respective condition;

first transmission circuit means having a plurality of channels coupling the pulse signals from said sensors to a control station;

a high-speed digital computer at said control station;

memory means associated with said computer, said memory means including first and second sections each providing a group of separate locations for storing separate data words which are individually addressable;

means at said control station responsive to the incoming pulse signals from said sensors and operable to store in corresponding memory locations digital measurement signals reflecting the status of the process condition represented by the received pulse signals;

a plurality of process operators for setting the values of selected process variables which influence at least certain of said measured process conditions;

said computer including means arranged to operate on said stored measurement signals to produce corresponding command signals, each representing an instruction for a corresponding process operator, and to store such command signals in corresponding memory locations;

said command signals being stored as separate command words in separate locations in said first section;

means for shifting the data in the stored command words into the second section with the corresponding bits of the same binary weight of all of the command words being placed in respective storage locations, whereby all MSB's can be addressed individually, all NMSB's can be addressed individually, etc.;

output means at said control station to produce a set of output pulse-train signals each having an average frequency determined by a corresponding command signal, said output means including means to use said transposed words in a predetermined sequence to produce said pulse-train output signals; and second transmission circuit means coupling said output signals to respective process operators;

said process operators being responsive to said pulse-train output signals for setting said variables in accordance with the corresponding signal frequency.

6. A computer-operated industrial process control system comprising:

a plurality of sensors each responsive to a condition of the process such as temperature or flow rate and arranged to produce pulse signals containing information indicating the respective condition, at least a portion of said sensors including means to produce pulse-train signals having a frequency responsive to the measured process condition;

first transmission circuit means having a plurality of channels coupling the pulse signals from said sensors to a control station;

a high-speed digital computer at said control station, said coupurter including input logic circuitry operating under program control and serving to produce measurement signals representing the number of incoming pulses received during predetermined time intervals;

memory means associated with said computer, said memory means comprising an input storage section having a plurality of separate storage locations each corresponding to one of said sensors producing pulse-train measurement signals;

said input logic circuitry including means to periodically sample the individual channels of said first transmission circuit means and to increment a storage location in said input storage section whenever an input pulse is received from the corresponding sensor so that each storage location maintains a continuously up-dated number representing the count of pulses received from its associated sensor;

a plurality of process operators for setting the values of selected process variables which influence at least certain of said measured process conditions;

said computer including means operable after a predetermined time interval of counting to read-out the accumulated data as measurement signals, and further including means to operate on said stored measurement signals to produce corresponding command signals, each representing an instruction for a corresponding process operator, and to store such command signals in corresponding memory locations;

output means at said control station to produce a set of output pulse-train signals each having an average frequency determined by a corresponding command signal; and second transmission circuit means coupling said output signals to respective process operators;

said process operators being responsive to said pulse-train output signals for setting said variables in accordance with the corresponding signal frequency.

7. The method of controlling an industrial process of the type having a plurality of conditions which are variable in accordance with the setting of associated process operators such as valves or the like, said method comprising the steps of:

producing a plurality of pulse signals each representing the state of a corresponding process condition;

transmitting said pulse signals to a control station for processing;

sampling said pulse signals at said control station to develop corresponding digital measurement signals each representing a corresponding condition;

performing, at intervals, predetermined computations on said measurement signals to produce corresponding digital command signals;

converting each of said digital command signals into a pulse-train signal the average frequency of which represents the command instruction for a respective process operator, said conversion being effected by transposing the parallel digital command signals into a group of data words each containing all of the command data bits of common binary weight, such that one transposed data word will contain all of the MSB's, another data word will contain all of the NMSB's and so forth; and setting said process operators in accordance with the respective pulse-train signals developed at said processing station.

8. The method of claim 7, wherein the conversion step further includes the step of utilizing said transposed data words in a predetermined sequence, based on the relative binary weights thereof, to develop said pulse-train signals for the process operators.

9. In a process control system of the type including a time-shared digital computer arranged to receive a plurality of measurement signals reflecting the states of corresponding process conditions such as temperature, flow rate and the like, and wherein the computer includes means functioning under program control to perform computations respecting said measurement signals so as to develop corresponding command signals providing instructions for operating elements such as process valves, each command signal being stored in a respective location in the computer memory;

that improvement in such a process control system wherein the command signals comprise a set of separate multi-bit digital instructions stored with all of the data bits of the same binary weight capable of being accessed as separate individually-addressable output words;

output means operable with the command signals stored in said memory to produce from each command signal a pulse-train output signal having an average frequency corresponding to the instruction data contained in the command signal, said output means including means for accessing said individually addressable words in a predetermined sequence and for controlling each output pulse signal in conformance with the state of the corresponding bit of the accessed words; and transmission circuit means coupling said pulse-train output signals to respective process operators.

10. A process control system as claimed in claim 9, wherein each bit position of each of said output words is assigned to a corresponding channel of the transmission circuit mean and a pulse-producing device for each of said channels;

said output means including means operable to direct the individual bits of each accessed output word to the respective pulse-producing device to control the activation of each channel in accordance with the state of th bit position assigned to such channel, the sequential accessing of said output words providing for each channel a sequential series of high and low pulse states relfecting the binary states of the corresponding bit positions of the accessed output words.

11. In an industrial process control system of the type comprising a central station including a digital computer with an addressable memory, said memory comprising a large number of separately accessible locations each capable of storing a plurality of data bits, the process control system serving to measure the magnitudes of a number of different process conditions and to produce respective ouptut signals for process operators and the like;

the combination of;

sensor means responsive to said process conditions including means for developing separate pulse-train signals the repetition rates of which reflect the magnitudes of respective conditions;

coupling circuit means for directing said pulse-train signals to said central station;

program control means including stored program instructions operable in repetitive periodic base cycles each establishing a series of sequential operating functions;

input means for periodically sampling the signals at said coupling circuit means and for developing binary signals identifying all of the individual pulses of said pulse-train signals;

said program control means including first means operable with said input means at selected first times of each program base cycle for transferring and storing in separate locations of said addressable memory, in accordance with stored program instructions, respective data signals each representing the accumulated number of input pulses received from a corresponding pulse-train input signal over a predetermined portion of each base cycle period;

said program control means including second means operable at selected second times of each program base cycle to perform on each of said stored data signals predetermined computations in accordance with stored program instructions to develop a series of corresponding digital command signals; and said program control means including third means operable at selected third times of each program base cycle to perform manipulations on said digital command signals in accordance with stored program instructions to develop corresponding binary pulse output signals.

12. Apparatus as claimed in claim 11, wherein said sensor means comprises a plurality of sensors located remotely from said central station and adjacent the process;

each such remote sensor including means to develop a pulse-train signal having a frequency proportional to the measured condition; and transmission means connecting each remote sensor to said cnetral station to carry the respective pulse-train signal to that station.

13. Apparatus as claimed in claim 12, wherein said coupling circuit means comprises separate channels for each pulse-train signal;

said input means comprising means to sample all of said channels periodically and at a high rate of speed, sufficiently fast to sample all of the lines during the time duration of any one incoming pulse; and register means coupled to said sampling means and having a plurality of separate stages to receive and temporarily store binary sample signals from respective transmission channels.

14. Apparatus as claimed in claim 13, wherein said first means includes means operable between each sampling operation to analyze the pulses stored in said register means to determine whether it represents a change of state from the preceding pulse.

15. Apparatus as claimed in claim 11, wherein said third means comprises means to produce output signals in the form of pulse-train signals the average frequencies of which represent the magnitude of the corresponding command signal.

16. Apparatus as claimed in claim 15, including output means responsive to said output signals for directing to process operators signals corresponding to said pulse-trains signals respectively.

17. Apparatus as claimed in claim 16, wherein said process operators are located remotely from said central station, adjacent the controlled process;

said output means including transmission circuit means having a plurality of channels each carrying one of said pulse-train signals to a corresponding process operator.

18. In an industrial process control system of the type comprising a central station including a digital computer with an addressable memory, said memory comprising a large number of separately accessible locations each capable of storing a plurality of data bits, the process control system serving to measure the magnitudes of a number of different process conditions and to produce respective output signals for process operators and the like;

the combination of;

sensor means responsive to said process conditions including means for developing measurement signals reflecting the magnitudes of respective conditions;

program control means at said central station operable in repetitive periodic base cycles each establishing a series of sequential operating functions;

input means at said central station for periodically sampling said measurement signals and for developing corresponding digital measurement signals;

said program control means including first means operable with said input means at selected first times of each program base cycle for transferring and storing in separate locations of said addressable memory respective data signals each representing a corresponding digital measurement signal;

said program control means including second means operable at selected second times of each program base cycle to preform on each of said stored data signals predetermined computations in accordance with stored program instructions to develop a series of corresponding digital command signals; and said program control means including third means operable at selected third times of each program base cycle to perform manipulations on said digital command signals in accordance with stored program instructions to develop corresponding pulse-train output signals, each having an average frequency representing the information contained in the corresponding command signal.

19. Apparatus as claimed in claim 18, wherein said third means comprises a set of storage locations in said computer memory, each adapted to store a multi-bit word;

means to store in each of said set of storage locations a multi-bit word each individual bit of which represents a portion of a respective command signal; and means to access said set of storage locations in a predetermined order to sequentially transfer the bits of each word to respective output channels, thereby to produce said pulse-train output signals.

20. Apparatus as claimed in claim 19, wherein one of said set of storage locations contains the MSBs of said command signals, a second contains the NBSBs of said command signal, etc.

21. In an industrial process control system of the type comprising a central station including a digital computer with an addressable memory, said memory comprising a large number of separately accessible locations each capable of storing a plurality of data bits, the process control system serving to measure the magnitudes of a number of different process conditions and to produce respective output signals for process operators and the like;

the combination of;

sensor means responsive to said process conditions;

circuit means coupled to said sensor means for developing measurement signals reflecting the magnitudes of respective conditions;

said circuit means including means for developing said measurement signals as pulse-train signals with repetition rates corresponding to said process conditions respectively;

program control means at said central station operable in repetitive periodic base cycles each establishing a series of sequential operating functions;

input means at said central station responsive to said pulse-train signals;

said program control means including first means operable with said input means at selected first times of each program base cycle for transferring and storing in separate locations of said addressable memory respective data signals each representing by a corresponding digital measurement signal the number of pulses developed in a respective pulse-train signal during a predetermined time interval;

said program control means including second means operable at selected second times of each program base cycle to perform on each of said stored data signals predetermined computations in accordance with stored program instructions to develop a series of corresponding digital command signals; and said program control means including third means operable at selected third times of each program base cycle to perform manipulations on said digital command signals in accordance with stored program instructions to develop corresponding digital pulse output signals each representing the information contained in the corresponding command signal.

22. A process control system as claimed in claim 21, wherein said input means comprises counter means operable independently of said program control means for developing signals responsive to the accumulation of pulses in the incoming pulse-train signals;

said first means being operable to sample the count in the respective counter to transfer to said addressable memory said corresponding digital measurement signals.

* * * * *

UNITED STATES PATENT OFFICE
CERTIFICATE OF CORRECTION

Patent No. 3,798,424         Dated March 19, 1974

Inventor(s) Manuel P. Freitas and Bernard P. Laeser

It is certified that error appears in the above-identified patent and that said Letters Patent are hereby corrected as shown below:

Column 6, line 2          Change "32" to --82--

Column 11, line 11        Change "MNSM's" to --NMSB's--

Signed and sealed this 17th day of September 1974.

(SEAL)
Attest:

McCOY M. GIBSON JR.
Attesting Officer

C. MARSHALL DANN
Commissioner of Patents